(12) United States Patent
Okabe et al.

(10) Patent No.: US 10,790,553 B2
(45) Date of Patent: Sep. 29, 2020

(54) WIRING DIAGNOSTIC APPARATUS, BATTERY SYSTEM, AND POWER SYSTEM

(71) Applicants: Kabushiki Kaisha Toshiba, Minato-ku (JP); Toshiba Infrastructure Systems & Solutions Corporation, Kawasaki-shi (JP)

(72) Inventors: Ryo Okabe, Hino (JP); Shinichiro Kosugi, Yokohama (JP); Masahiro Sekino, Shinjuku (JP); Norihiro Kaneko, Nerima (JP); Yusuke Kikuchi, Kawasaki (JP); Kazuto Kuroda, Arakawa (JP); Makoto Noguchi, Chofu (JP)

(73) Assignees: Kabushiki Kaisha Toshiba, Minato-ku (JP); Toshiba Infrastructure Systems & Solutions Corporation, Kawasaki-shi (JP)

( * ) Notice: Subject to any disclaimer, the term of this patent is extended or adjusted under 35 U.S.C. 154(b) by 153 days.

(21) Appl. No.: 15/963,433

(22) Filed: Apr. 26, 2018

(65) Prior Publication Data
US 2018/0248234 A1 Aug. 30, 2018

Related U.S. Application Data

(63) Continuation of application No. PCT/JP2015/080724, filed on Oct. 30, 2015.

(51) Int. Cl.
*H01M 10/48* (2006.01)
*H01M 10/42* (2006.01)
(Continued)

(52) U.S. Cl.
CPC ....... *H01M 10/482* (2013.01); *H01M 10/425* (2013.01); *H01M 10/4207* (2013.01);
(Continued)

(58) Field of Classification Search
None
See application file for complete search history.

(56) References Cited

U.S. PATENT DOCUMENTS

2015/0286198 A1   10/2015   Sugeno et al.

FOREIGN PATENT DOCUMENTS

JP          2014-124089 A         7/2014

OTHER PUBLICATIONS

Extended European Search Report dated May 2, 2019 in Patent Application No. 15907313.9, 6 pages.
(Continued)

*Primary Examiner* — Wojciech Haske
(74) *Attorney, Agent, or Firm* — Oblon, McClelland, Maier & Neustadt, L.L.P.

(57) ABSTRACT

According to one embodiment, a wiring diagnostic apparatus of embodiments includes a counter, an acquirer, and an abnormality determiner. The counter counts the number of battery modules connected to a plurality of first communication lines to which a plurality of battery modules are connected to form a communication channel for each of the first communication lines. The acquirer acquires identification information for identifying a battery module connected to a corresponding second communication line among battery modules connected to a plurality of second communication lines each forming a communication channel with a first communication line via the second communication line. The abnormality determiner determines an abnormality in a wiring relationship of the first communication line or the second communication line on the basis of the number of battery modules counted by the counter and identification information acquired by the acquirer.

10 Claims, 10 Drawing Sheets

(51) Int. Cl.
      *H02H 7/18*       (2006.01)
      *H02J 7/00*       (2006.01)
      *H01M 2/34*       (2006.01)
      *H02J 7/02*       (2016.01)

(52) U.S. Cl.
      CPC .......... *H01M 10/4285* (2013.01); *H02H 7/18* (2013.01); *H02J 7/00* (2013.01); *H01M 2/34* (2013.01); *H01M 2010/4278* (2013.01); *H02J 7/0013* (2013.01); *H02J 7/02* (2013.01)

(56) References Cited

OTHER PUBLICATIONS

International Search Report dated Dec. 28, 2015 in PCT/JP20151080724 (with English translation), 2 pages.

FIG. 9

| COMMUNICATION CHANNEL | MODULE ID | MODULE ABNORMALITY DETERMINATION RESULT | SOC | TEMPERATURE | WIRING RELATION ABNORMALITY DETERMINATION RESULT |
|---|---|---|---|---|---|
| ch1 | MDL1-1 | NORMAL | 90% | 23°C | NORMAL |
| | MDL1-2 | PARTIAL FAILURE | — | — | |
| | MDL1-3 | NORMAL | 85% | 30°C | |
| | ... | ... | ... | ... | |
| ch2 | MDL2-1 | — | — | — | CONFUSED |
| | MDL2-2 | — | — | — | |
| | MDL2-3 | — | — | — | |
| | ... | ... | ... | ... | |
| ch3 | ... | ... | ... | ... | WIRED TO ANOTHER CHANNEL |
| ... | ... | ... | ... | ... | ... |

WIRING DIAGNOSTIC APPARATUS, BATTERY SYSTEM, AND POWER SYSTEM

CROSS REFERENCE TO RELATED APPLICATION

This application is based upon and claims the benefit of priority from International Application No. PCT/JP2015/080724, filed Oct. 30, 2015; the entire contents all of which are incorporated herein by reference.

FIELD

Embodiments described herein relate generally to a wiring diagnostic apparatus, a battery system, and a power system.

BACKGROUND

In the related art, a technology for managing a plurality of batteries and transmitting states of the batteries to an external device is known. In the conventional technology, since a plurality of batteries are connected via one communication channel, there is a limit on the number of batteries which can be connected due to effects such as attenuation of signals transmitted to batteries. Therefore, there has been a need to provide a large number of communication channels to connect batteries exceeding an upper limit. When a large number of communication channels are provided, wiring relations of communication lines forming such a large number of communication channels become complicated, and abnormalities are likely to occur in these wiring relations. However, an abnormality in a wiring relation cannot be ascertained in some cases in the conventional technology.

BRIEF DESCRIPTION OF THE DRAWINGS

FIG. 9 is a diagram which shows an example of management information notified of by an information transmitter in the first embodiment.

DETAILED DESCRIPTION

According to one embodiment, a wiring diagnostic apparatus of embodiments includes a counter, an acquirer, and an abnormality determiner. The counter counts the number of battery modules connected to a plurality of first communication lines to which a plurality of battery modules are connected to form a communication channel for each of the first communication lines. The acquirer acquires identification information for identifying a battery module connected to a corresponding second communication line among battery modules connected to a plurality of second communication lines each forming a communication channel with a first communication line via the second communication line. The abnormality determiner determines an abnormality in a wiring relationship of the first communication line or the second communication line on the basis of the number of battery modules counted by the counter and identification information acquired by the acquirer.

Hereinafter, a wiring diagnostic apparatus, a battery system, and a power system of the embodiments will be described with reference to drawings.

First Embodiment

Figure 1:
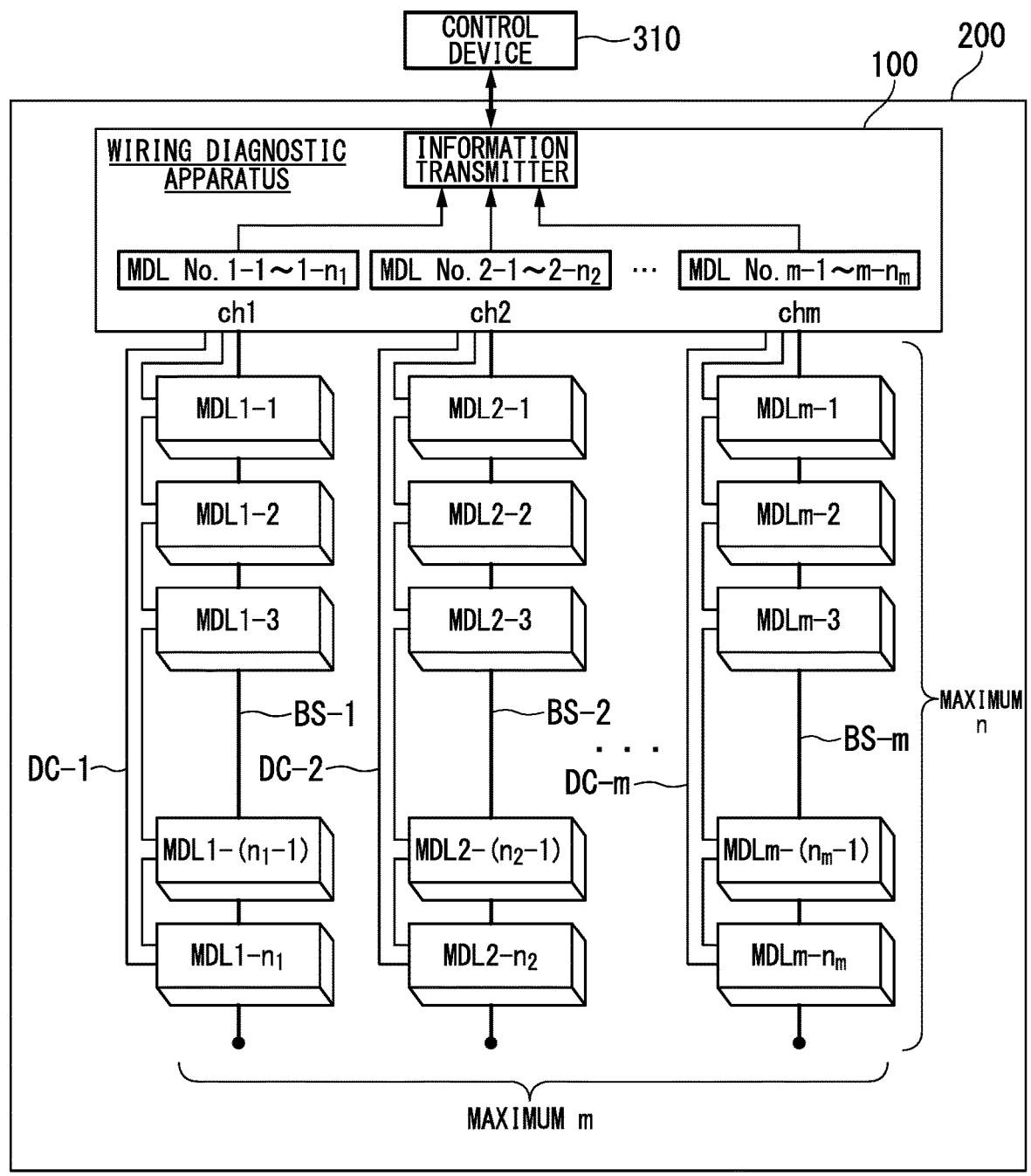
FIG. 1 is a diagram which shows a configuration example of a battery system according to a first embodiment.

FIG. 1 is a diagram which shows a configuration example of a battery system 200 according to a first embodiment. The battery system 200 in the present embodiment may include a plurality of battery modules MDL1-1 to MDLm-nm and a wiring diagnostic apparatus 100, but the present invention is not limited thereto. The plurality of battery modules MDL1-1 to MDLm-nm and the wiring diagnostic apparatus 100 may be connected via a first communication line DC and a second communication line BS forming a communication channel (indicated by ch in FIG. 1). Here, the communication channel is a group of communication groups which is formed by the wiring diagnostic apparatus 100 and some or all of battery modules MDL1-1 to MDLm-nm being connected to each other by a first communication line DC and a second communication line BS. Hereinafter, a battery module is simply denoted as a battery module MDL when the battery module is not distinguished from other battery modules.

In addition, the wiring diagnostic apparatus 100 communicates with a control device 310. The control device 310 controls a battery system 200 on the basis of, for example, management information transmitted by the wiring diagnostic apparatus 100.

The first communication line DC connects, for example, the plurality of battery modules MDL and the wiring diagnostic apparatus 100 in an annular daisy chain shape. When seen from the wiring diagnostic apparatus 100, the first communication line DC has an output side line for outputting a signal and an input side line for inputting a signal. In addition, the second communication line BS connects the plurality of battery modules MDL to the wiring diagnostic apparatus 100 as an internal bus. The second communication line BS is, for example, a CAN cable, and a terminating resistor (or a device equivalent thereto), for example, is connected to one end of this second communication line BS.

Moreover, the plurality of battery modules MDL are connected by a power line that is not shown. The power line may be formed in a different form from the first communication line DC and the second communication line BS described above, and battery modules MDL constituting one communication channel may be connected in series or may be connected in parallel. In addition, battery modules MDL provided across a plurality of communication channels may also be connected in series using one power line. As described above, it is possible to arbitrarily determine a configuration of a communication channel (each communication line) and a connection configuration on a power line independently in the battery system 200.

In general, since distance attenuation or the like occurs in a signal transmitted to the second communication line BS functioning as an internal bus in accordance with a length of the communication line, an effective length is provided in a line length of the second communication line BS. In addition, when communication is performed on the basis of the CAN protocol, there is a limit on the number of communication nodes related to arbitration processing. For this reason, there is a limit to the number of battery modules MDL which can be connected to one communication channel. In the present embodiment, the maximum number of battery modules MDL which can be connected to one communication channel is described as n.

In addition, there is also a limit to the number of communication channels in the wiring diagnostic apparatus 100 due to a dispersion processing capability of the wiring diagnostic apparatus 100, and the like. Hereinafter, the maximum number of communication channels in the wiring diagnostic apparatus 100 is described as m.

Figure 2:
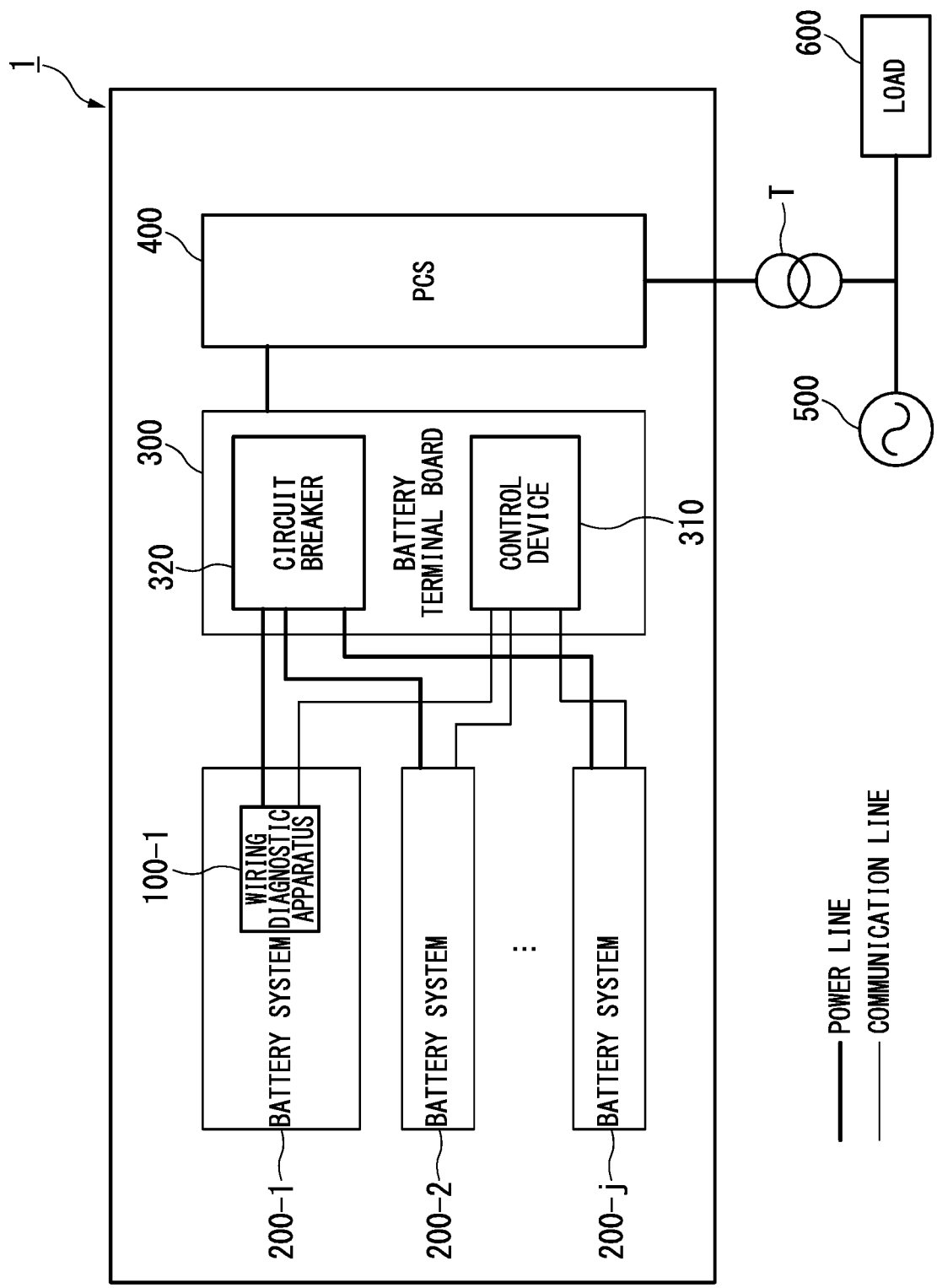
FIG. 2 is a diagram which shows an example of a use of the battery system according to the first embodiment.

FIG. 2 is a diagram which shows an example of a use of the battery system 200 according to the first embodiment. The battery system 200 is connected to a power conditioning system (PCS) 400 via, for example, a battery terminal board 300 to be used, and constitutes a power system 1. The PCS 400 is connected to, for example, a system power 500 and a load 600.

For example, the plurality of battery modules MDL and the wiring diagnostic apparatus 100 are included in each of a plurality of battery systems 200-1 to 200-j. The wiring diagnostic apparatus 100 causes the battery modules MDL to be charged or discharged in units of this battery system.

The battery terminal board 300 may include the control device 310 and a circuit breaker 320, but the present invention is not limited thereto. The control device 310 may include a processor such as a central processing unit (CPU). The control device 310 monitors a state of the circuit breaker 320, transmits information received from the PCS 400 to the wiring diagnostic apparatus 100 of each battery system, and, at the same time, transmits information received from the wiring diagnostic apparatus 100 to the PCS 400. In addition, the control device 310 controls the circuit breaker 320 on the basis of the information received from the wiring diagnostic apparatus 100, and causes a place between the battery system 200 side and the PCS 400 side to conduct electricity or to be blocked electrically. The control device 310 is an example of an external device.

The circuit breaker 320 blocks power discharged by each battery system 200, or power supplied to each battery system 200 for charging electricity in a power line network. The circuit breaker 320 may function as, for example, a disconnecting switch (service disconnector), and may function as a fuse. The circuit breaker 320 may be included in each of the battery systems 200-1 to 200-j. In this case, each wiring diagnostic apparatus 100 may control the circuit breaker 320 provided in the same battery system 200 and switch between charging and discharging by the battery modules MDL.

The PCS 400 includes a processor such as a CPU, a communication interface for bi-directionally communicating with the control device 310, and the like. The PCS 400 converts, for example, DC power discharged from the battery system 200 into AC power on the basis of a control signal transmitted by the control device 310, and boosts a voltage of the converted AC power. In addition, the PCS 400 converts, for example, AC power which is supplied from the system power 500 and whose voltage is converted by a transformer T into DC power, and lowers the voltage to a voltage with which the battery modules MDL can be charged. The battery system 200 is not limited to an application example of the use described above, and can also be used as, for example, a battery system mounted on a moving object such as a railroad car, an automobile, a ship, or an aircraft.

Figure 3:
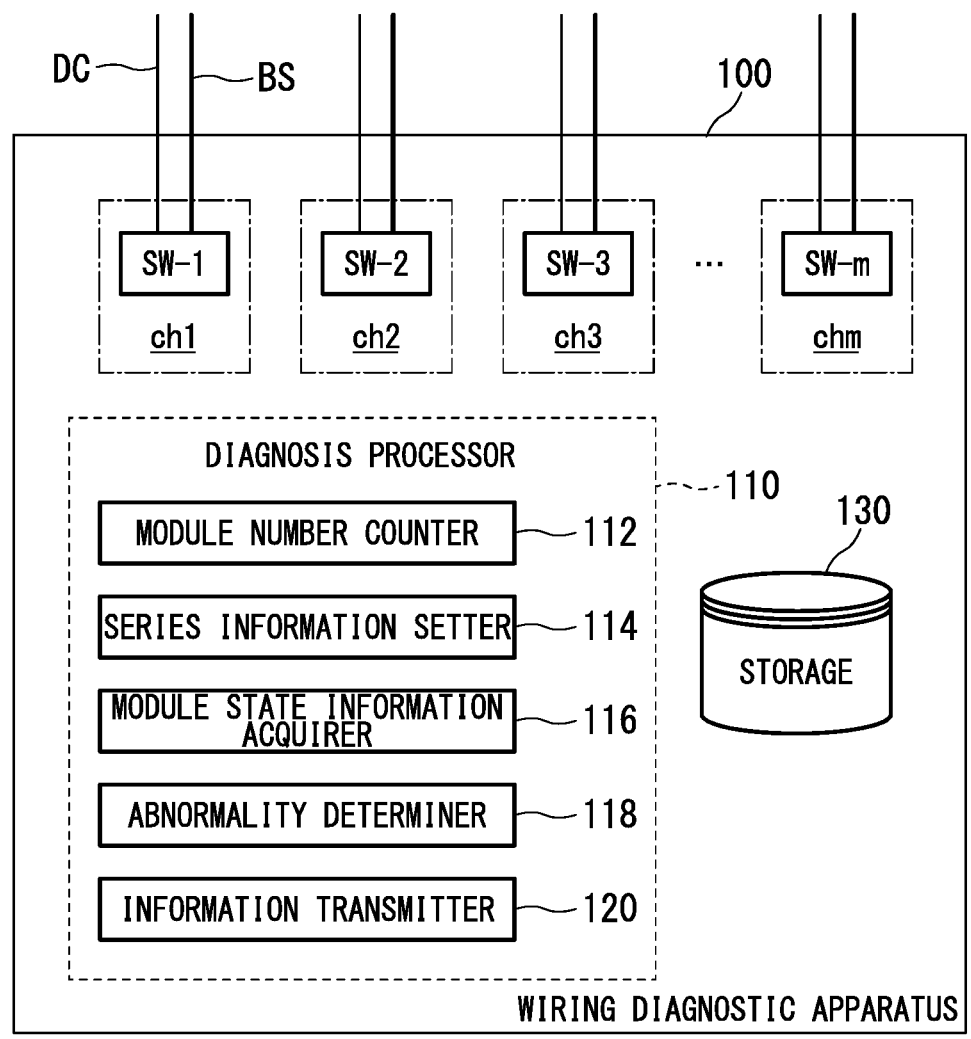
FIG. 3 is a diagram which shows an example of a configuration of a wiring diagnostic apparatus according to the first embodiment.

FIG. 3 is a diagram which shows an example of the configuration of the wiring diagnostic apparatus 100 according to the first embodiment. The wiring diagnostic apparatus 100 in the present embodiment may include connection switches SW-1 to SW-m each being connected to a first communication line DC and a second communication line BS forming each of the plurality of communication channels, a diagnosis processor 110, and a storage 130, but the present invention is not limited thereto. Hereinafter, a connection switch is simply denoted as a connection switch SW when the connection switch is not distinguished from other connection switches.

A power supply cable for power supply, a ground line, and the like, in addition to the first communication line DC and the second communication line BS, may be connected to each of the connection switches SW. Each of the connection switches SW detects that one or both of the first communication line DC and the second communication line BS are connected thereto.

For example, a connection switch SW detects that the first communication line DC and the second communication line BS are connected to the wiring diagnostic apparatus 100 by detecting that a voltage of a detection point to which a predetermined voltage is applied in advance drops to near 0 V in response to a ground line forming a group of cables, in addition to the first communication line DC and the second communication line BS, being connected thereto. In this case, a connection switch SW outputs an ON signal (a voltage signal of 0 V) to the diagnosis processor 110 when the first communication line DC and the second communication line BS are connected to the wiring diagnostic apparatus 100. In the following description, a state in which an ON signal is output by a connection switch SW, that is, a state in which the first communication line DC and the second communication line BS are connected to the wiring diagnostic apparatus 100, is referred to as an "ON state," and a state in which an ON signal is not output by a connection switch SW, that is, a state in which the first communication line DC and the second communication line BS are not connected, is referred to as an "OFF state." A connection switch SW is not limited to a switch for detecting that a voltage of a detection point lowers from a predetermined voltage to about 0 V as described above, but may also be a switch for detecting that a voltage of a detection point rises to a predetermined voltage.

The diagnosis processor 110 may include, for example, a module number counter (counter) 112, a series information setter 114, a module state information acquirer 116, an abnormality determiner 118, and an information transmitter 120, but the present invention is not limited thereto. Some or all of the functional units of the diagnosis processor 110 may be realized by a processor such as a CPU executing a program stored in the storage 130. The program, for example, may be downloaded from an application server via a network, and a program stored in a portable storage medium such as an SD card may also be installed in the wiring diagnostic apparatus 100. In addition, some or all of the functional units of the diagnosis processor 110 may also be realized by hardware such as a large scale integration (LSI), an application specific integrated circuit (ASIC), and a field-programmable gate array (FPGA).

The storage 130 may be realized by a non-volatile storage medium such as a read only memory (ROM), a flash memory, a hard disk drive (HDD), or an SD card, and a volatile storage medium such as a random access memory (RAM) or a register. The storage 130 stores a result of processing by the diagnosis processor 110 in addition to a program executed by a processor.

When a connection switch SW is in an ON state, the module number counter 112 counts the number of battery modules MDL connected to a first communication line DC (or a second communication line BS) forming a communication channel corresponding to this connection switch. For example, the module number counter 112 determines whether a connection switch SW is in an ON state for each first communication line DC (communication channel), transmits a confirmation signal (a predetermined signal) for counting the number of battery modules MDL to a corresponding first communication line DC forming a communication channel if a connection switch SW is turned to an ON state from an OFF state, and counts the number of battery modules MDL by receiving a response signal to this confirmation signal. In the following description, a communication channel which has transmitted the confirmation signal is referred to as a transmission channel, and a communication channel which has received the response signal is referred to as a reception channel.

The series information setter 114 sets a series of pieces of information of a plurality of battery modules MDL connected to a first communication line DC for each battery module MDL as information for identifying a battery module MDL on the basis of the number of battery modules MDL counted by the module number counter 112. The series of pieces of information is, for example, information represented by consecutive numbers (1, 2, 3, . . . ) or letters (A, B, C, . . . ), and may be in any form as long as it is information which can be processed by the control device 310. In the present embodiment, the series of pieces of information is described as consecutive decimal numbers.

The module state information acquirer 116 acquires state information of each battery module MDL by transmitting a request signal for acquiring state information of a battery module MDL to a second communication line BS connected to a connection switch SW in an ON state, and receiving an answer signal to this request signal from each battery module MDL via the second communication line BS. The state information is, for example, information in which information on battery parameters such as a temperature and a state of charge (SOC) of each battery module MDL is attached to identification information set for each battery module MDL in advance.

When a confirmation signal is transmitted by the module number counter 112, the abnormality determiner 118 determines whether an abnormality occurs in a battery module MDL for each first communication line DC depending on whether a response signal to this confirmation signal is received. For example, when a response signal is not received via a first communication line DC, or when a response signal including content other than preliminarily assumed content is received, the abnormality determiner 118 determines that an abnormality occurs in a battery module MDL connected to a first communication line DC to which a confirmation signal is transmitted. In addition, the abnormality determiner 118 determines that an abnormality does not occur in a battery module MDL connected to a first communication line DC to which a confirmation signal is transmitted when a normal response signal is received.

The abnormality determiner 118 determines that a failure occurs in some of the internal functions of a battery module MDL when it is determined that an abnormality occurs in the battery module MDL, and a signal indicating that there is a failure (hereinafter referred to as a failure signal) is received from the battery module MDL via the second communication line BS.

On the other hand, the abnormality determiner 118 determines that a failure occurs in the entire battery module MDL when it is determined that an abnormality occurs in the battery module MDL, and a failure signal is not received from the battery module MDL via the second communication line BS.

In addition, the abnormality determiner 118 determines a state in which a set of communication lines (a first communication line DC and a second communication line BS) is connected to one battery module MDL to be normal, and determines a state in which a relationship of a set of communication lines being connected to one battery module MDL is broken to be abnormal. For example, in the case of a state in which only one of the communication lines is connected to one battery module MDL, or a state in which a plurality of first communication lines DC or second communication lines BS are connected, the abnormality determiner 118 determines that an abnormality occurs in a wiring relationship of these communication lines.

Hereinafter, a method of determining an abnormality in a wiring relation by the abnormality determiner 118 will be described. For example, when a request signal is transmitted by the module state information acquirer 116, the abnormality determiner 118 determines whether an abnormality occurs in the wiring relationship of a second communication line BS forming a communication channel which has transmitted the request signal by determining whether the communication channel which has transmitted the request signal coincides with a communication channel which has received an answer signal on the basis of content of an answer signal for this request signal. In the following description, a communication channel which has transmitted a request signal is referred to as a transmission channel in the same manner as a communication channel which has transmitted a confirmation signal described above, and a communication channel which has received an answer signal is referred to as a reception channel in the same manner as a communication channel which has received a response signal described above.

For example, the abnormality determiner 118 determines that an abnormality does not occur in a wiring relationship of the second communication line BS forming a transmission channel when the transmission channel coincides with a reception channel, and determines that an abnormality occurs in the wiring relationship of the second communication line BS forming a transmission channel when the transmission channel does not coincide with a reception channel.

In addition, the abnormality determiner 118 determines whether an abnormality occurs in a wiring relationship of a first communication line DC to be counted by the module number counter 112 by determining whether or not the number of battery modules MDL counted by the module number counter 112 is equal to or less than the maximum number n of battery modules MDL which can be connected to one communication channel.

For example, the abnormality determiner 118 determines that an abnormality does not occur in the wiring relationship of a first communication line DC to be counted by the module number counter 112 when the number of battery modules MDL counted by the module number counter 112 is equal to or less than the maximum number n, and determines that an abnormality occurs in the wiring relationship of a first communication line DC to be counted by the module number counter 112 when the number of battery modules MDL counted by the module number counter 112 exceeds the maximum number n.

Moreover, the abnormality determiner 118 determines, for example, whether an abnormality occurs in the wiring relationship of a first communication line DC to be counted by the module number counter 112 by determining whether the reference number of battery modules MDL stored in the storage 130 in advance coincides with the number of battery modules MDL counted by the module number counter 112. The reference number of battery modules MDL may be, for example, the number of battery modules MDL counted by the module number counter 112, and may be a numerical value input to the wiring diagnostic apparatus 100 using a user interface and the like, a user of which is not shown, at the time of an initial start of the battery system 200. Moreover, the reference number of battery modules MDL may also be determined by information received from the control device 310. Furthermore, the reference number of battery modules MDL may also be set for each communication channel and may also be set as a common number for all communication channels.

For example, the abnormality determiner 118 determines that an abnormality does not occur in the wiring relationship of a first communication line DC to be counted by the module number counter 112 when the reference number of battery modules MDL coincides with the number of battery modules MDL counted by the module number counter 112, and determines that an abnormality occurs in the wiring relationship of a first communication line DC to be counted by the module number counter 112 when the reference number of battery modules MDL does not coincide with the number of battery modules MDL counted by the module number counter 112.

The information transmitter 120 transmits management information in which state information of a battery module MDL is associated with each of a series of pieces of information set by the series information setter 114 to the control device 310. For example, state information such as SOC and the like of each battery module MDL, a result of determination by the abnormality determiner 118, and other types of information may be associated with each of the series of pieces of information in the management information.

Figure 4:
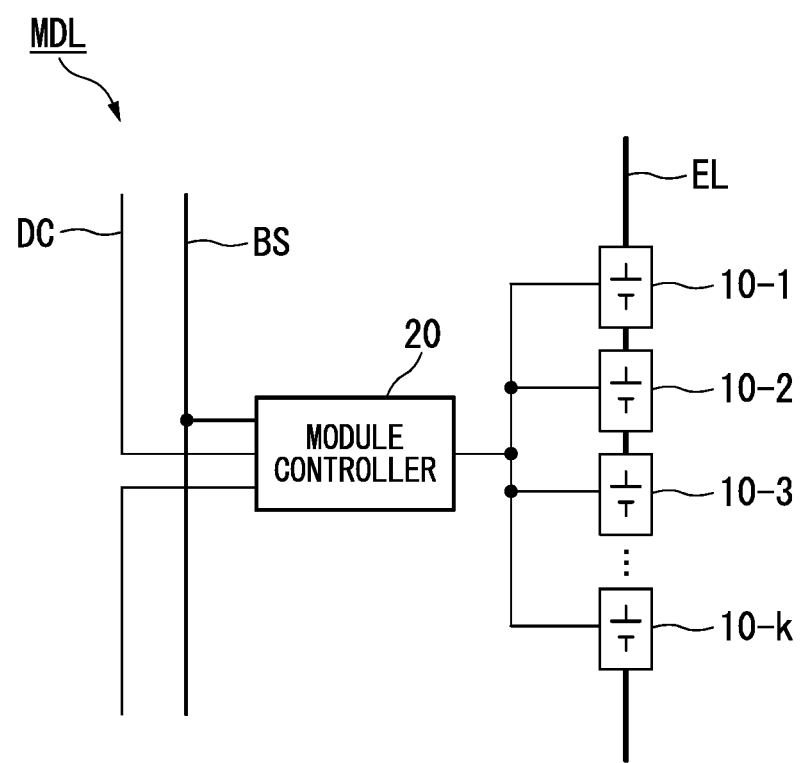
FIG. 4 is a diagram which shows an example of a configuration of a battery module according to the first embodiment.

FIG. 4 is a diagram which shows an example of a configuration of a battery module MDL according to the first embodiment. The battery module MDL may include, for example, a plurality of secondary batteries 10-1 to 10-$k$ and a module controller 20, but the present invention is not limited thereto. In the shown example, the plurality of secondary batteries 10-1 to 10-$k$ are connected in series by a power line EL. The plurality of secondary batteries 10-1 to 10-$k$ are, for example, lithium ion batteries, lead storage batteries, sodium sulfur batteries, redox flow batteries, nickel-hydrogen batteries, or the like. In the case of lithium ion batteries, lithium titanate may be used as a negative electrode material. In addition, each of the plurality of secondary batteries 10-1 to 10-$k$ may be a battery pack in which a plurality of battery cells are connected to each other in parallel or in series.

The module controller 20 charges or discharges each of the plurality of secondary batteries 10-1 to 10-$k$ under control from the wiring diagnostic apparatus 100 which has received a charging/discharging power command. At this time, the module controller 20 transmits a failure signal to the wiring diagnostic apparatus 100 via a second communication line BS when the module controller 20 cannot charge or discharge any of the secondary batteries 10-1 to 10-$k$.

In addition, upon receiving a confirmation signal from the wiring diagnostic apparatus 100 via a first communication line DC, the module controller 20 rewrites, for example, a predetermined variable in the confirmation signal to a value incremented by 1, and transmits a confirmation signal with this rewritten variable to a battery module MDL electrically adjacent to a corresponding battery module MDL via the first communication line DC. In the communication channel ch1 in the example of FIG. 1 described above, a confirmation signal transmitted by the wiring diagnostic apparatus 100 has a predetermined variable written by a battery module MDL1-1. The confirmation signal with this rewritten variable is transmitted to a battery module MDL1-2 from the battery module MDL1-1. In this manner, the variable of the confirmation signal is incremented by 1 whenever a signal is transmitted to a battery module MDL of the latter part as seen from the wiring diagnostic apparatus 100. A battery module MDL1-$n$1 of the lattermost part transmits this confirmation signal to the wiring diagnostic apparatus 100 as a response signal after the variable of the confirmation signal is rewritten to a value incremented by 1. As a result, the wiring diagnostic apparatus 100 determines the number of a battery module MDL connected to a first communication line DC by confirming the variable of the confirmation signal which has been received as a response signal. The module controller 20 may also notify the wiring diagnostic apparatus 100 of the number of battery modules MDL by decrementing a predetermined variable in the confirmation signal (for example, a value set equal to or greater than the maximum value n of the battery modules MDL for each communication channel) by 1 instead of incrementing 1.

In addition, the module controller 20 generates state information in which identification information for identifying a corresponding battery module MDL is associated with information on battery parameters such as a temperature and a SOC of the secondary batteries 10-1 to 10-$k$, and transmits this generated state information to the wiring diagnostic apparatus 100 via a second communication line BS as an answer signal if a request signal is received from the wiring diagnostic apparatus 100 via the second communication line BS.

Figure 5:
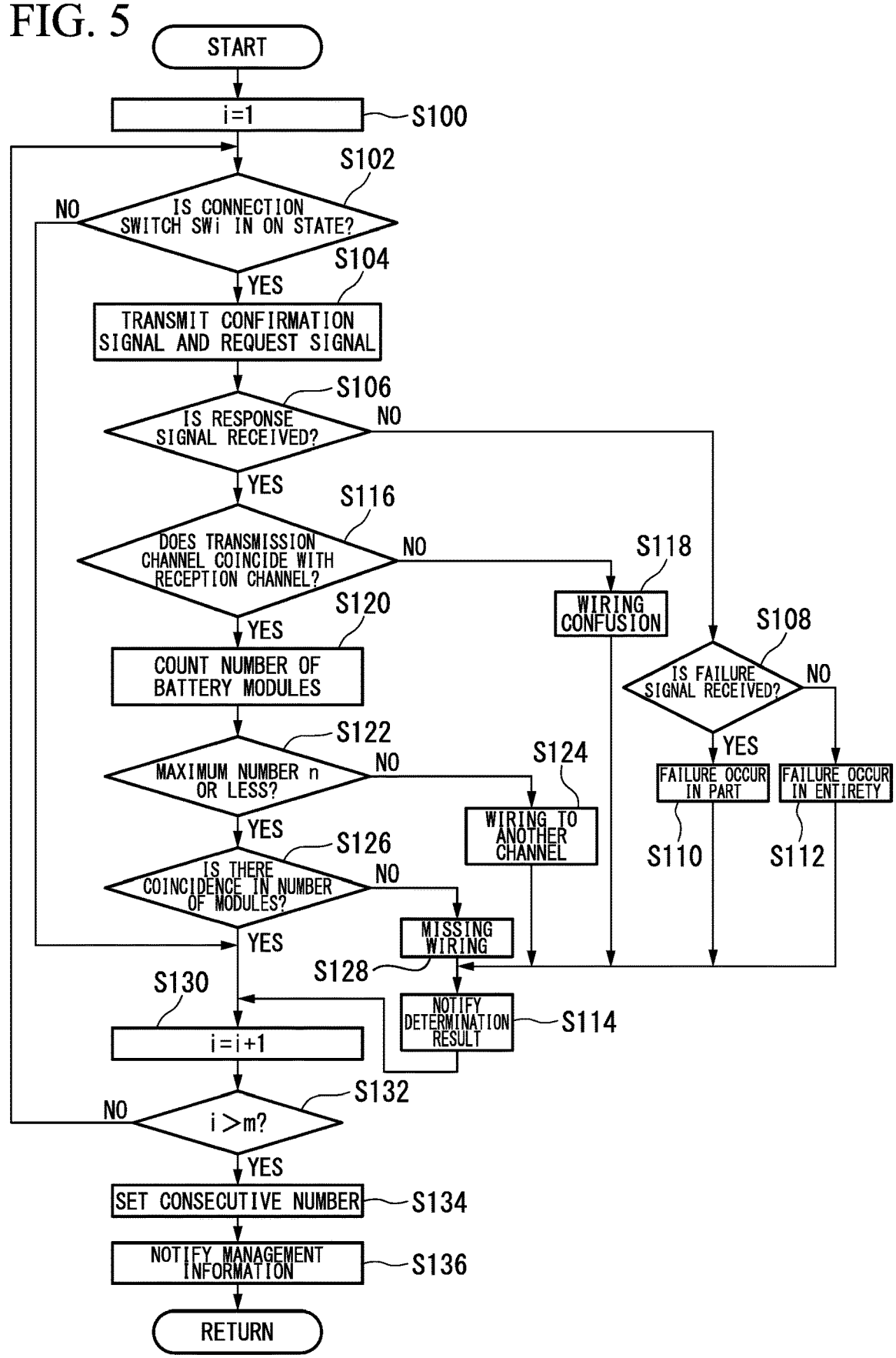
FIG. 5 is a flowchart which shows an example of a processing flow of a diagnosis processor in the first embodiment.

Hereinafter, a processing flow of the diagnosis processor 110 in the first embodiment will be described using a flowchart. FIG. 5 is a flowchart which shows an example of the processing flow of the diagnosis processor 110 in the first embodiment. The processing of the present flowchart starts, for example, when the battery system 200 starts.

First, the module number counter 112 sets an internal parameter i to 1 (step S100). Next, the module number counter 112 determines whether a connection switch SWi corresponding to an $i^{th}$ communication channel chi is in an ON state (step S102).

When the connection switch SWi is in the ON state, the module number counter 112 transmits a confirmation signal to a battery module MDLi-1 via an output side line of a first communication line DC-i forming the communication channel chi, and the module state information acquirer 116 transmits a request signal to each battery module MDL connected to a second communication line BS-i via the second communication line BS-i connected to the connection switch SW in the ON state (step S104).

Next, the module number counter 112 determines whether a confirmation signal (a response signal) with a rewritten variable is received from a battery module MDLi-ni (for example, MDL1-$n$1) of the lattermost part via an input side line of the first communication line DC-i (step S106).

When the module number counter 112 does not receive a response signal, the abnormality determiner 118 determines whether a failure signal has been received from a battery module MDL via a second communication line BS (step S108). When a failure signal has been received, the abnormality determiner 118 determines, for example, that the module controller 20 is normal and one of the secondary batteries 10-1 to 10-$k$ is abnormal, and determines that a failure occurs in some of the internal functions of a battery module MDL (step S110). On the other hand, when a failure signal is not received, the abnormality determiner 118 determines, for example, that both the module controller 20 and the secondary batteries 10-1 to 10-$k$ are abnormal, and determines that a failure occurs in the entire battery module MDL (step S112).

Next, the information transmitter 120 notifies the control device 310 of information showing a result of determination that a failure occurs in some or all of the battery modules MDL (step S114). Upon receiving this, the control device 310 controls the circuit breaker 320, blocks a current flowing through the battery module MDL, and stops the battery system 200.

On the other hand, when the module number counter 112 does not receive a response signal, the abnormality determiner 118 determines whether a transmission channel coincides with a reception channel on the basis of content of an answer signal for a request signal (step S116). When a transmission channel does not coincide with a reception channel, the abnormality determiner 118 assumes that a second communication line BS forming the transmission channel is confused with a second communication line BS forming another communication channel and determines that an abnormality occurs in the wiring relationship of the second communication line BS forming the transmission channel (step S118). Here, confusion indicates a state in which a plurality of second communication lines BS are connected to one battery module MDL.

Figure 6:
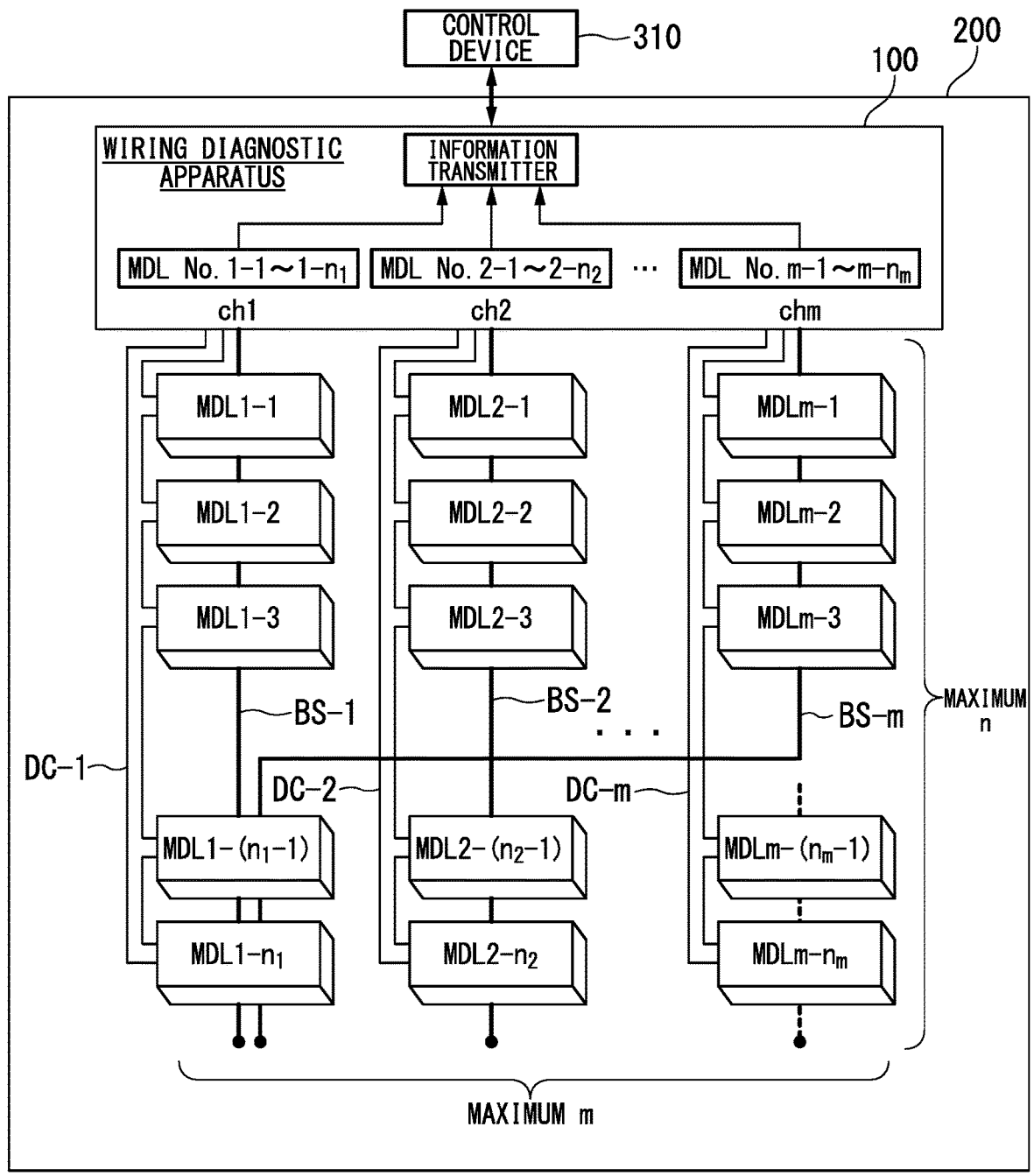
FIG. 6 is a diagram indicating a state in which a second communication line forming a transmission channel is confused with a second communication line of another communication channel.

FIG. 6 is a diagram indicating a state in which a second communication line BS forming a transmission channel is confused with a second communication line BS of another communication channel. In the shown example, a second communication line BS-m of a communication channel chm is confused and connected to battery modules MDL1-($n$1-1) and MDL1-$n$1 connected to a second communication line BS-1 of the communication channel ch1. Such a wiring state is caused by, for example, a human error or the like of an operator, or caused by communication lines being short-circuited or signals transmitted to a communication line being leaked due to effects such as deterioration of communication lines with age and external factors. When communication lines are confused, the battery modules MDL1-($n$1-1) and MDL1-$n$1 transmit an answer signal to the wiring diagnostic apparatus 100 via both of the second communication line BS-1 and the second communication line BS-m if a request signal transmitted via the second communication line BS-1 by the module state information acquirer 116 is received.

The wiring diagnostic apparatus 100 also receives an answer signal from a communication channel chm different from the communication channel ch1 which has transmitted a request signal as a transmission channel, and thus acquires duplicated identification information of the battery modules MDL1-($n$1-1) and MDL1-$n$1 included in this answer signal. Accordingly, after receiving the duplicated identification information of the battery modules MDL, the abnormality determiner 118 determines that a plurality of reception channels are formed for one transmission channel, that is, that second communication lines BS are confused with each other, and determines that a transmission channel does not coincide with a reception channel.

In this case, the information transmitter 120 assumes that an abnormality occurs in the wiring relationship of a second communication line BS forming the transmission channel, and notifies the control device 310 of information indicating that second communication lines BS are confused with each other. The abnormality determiner 118 may also determine that a transmission channel does not coincide with a reception channel when an answer signal is not received by the module state information acquirer 116 or when a communication protocol and the like of the answer signal is different from a prescribed communication protocol.

On the other hand, when a transmission channel coincides with a reception channel, the module number counter 112 refers to a value of a variable included in a response signal, and counts (determines) the number of battery modules MDL connected to the first communication line DC-i forming the communication channel chi (step S120).

Next, the abnormality determiner 118 determines whether or not the number of battery modules MDL counted by the module number counter 112 is equal to or less than the maximum number n of battery modules MDL which can be connected to one communication channel (step S122). When the number of battery modules MDL counted by the module number counter 112 exceeds the maximum number n, the abnormality determiner 118 assumes that the first communication line DC-i forming the communication channel chi is connected to a battery module MDL connected to another communication channel, and determines that an abnormality occurs in the wiring relationship of a first communication DC forming a transmission channel (step S124).

Figure 7:
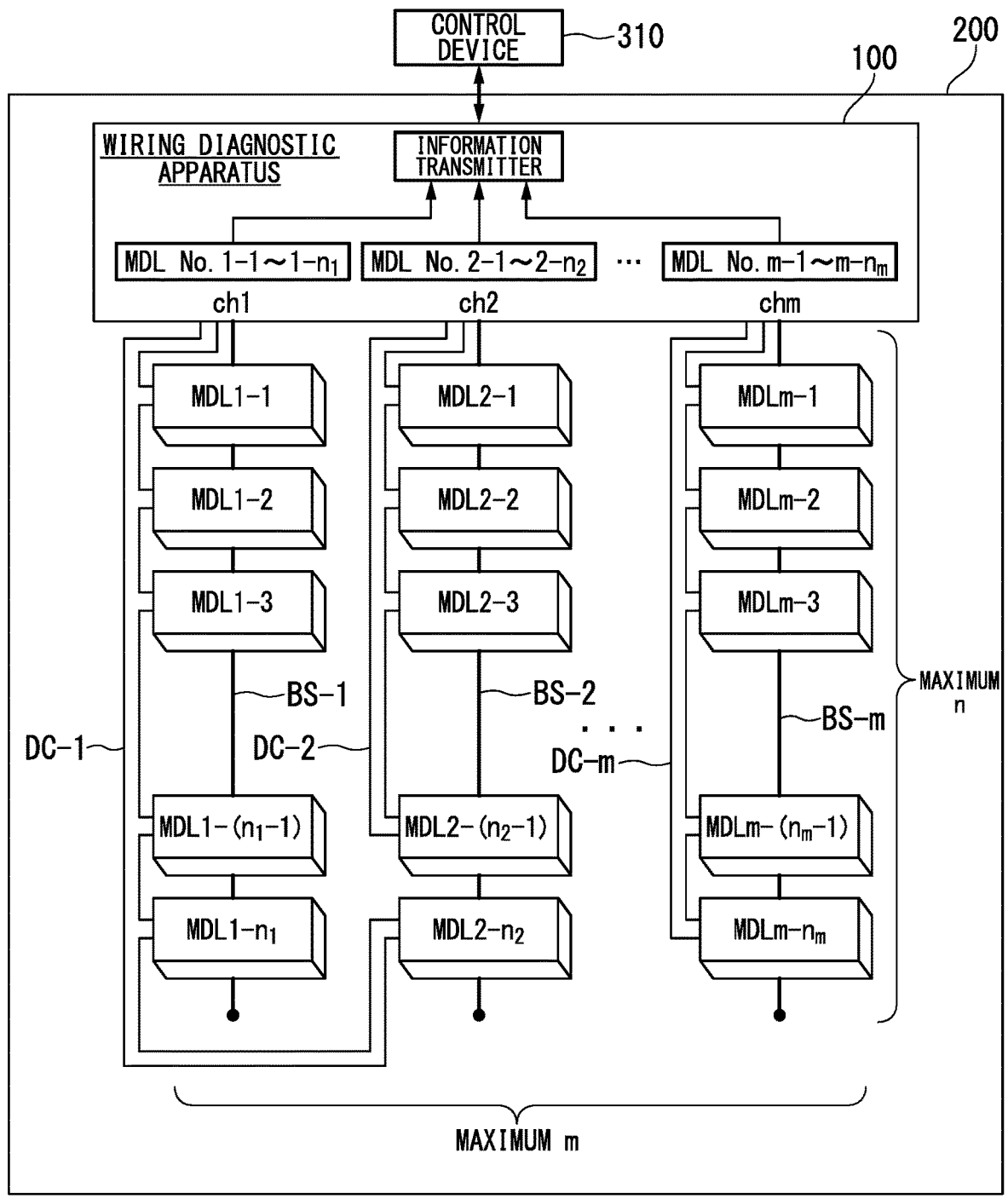
FIG. 7 is a diagram indicating a state in which a first communication line forming a transmission channel is wired to a battery module connected to a second communication line of another communication channel.

FIG. 7 is a diagram indicating a state in which a first communication line DC forming a transmission channel is wired to a battery module MDL connected to a second communication line BS of another communication channel. In the shown example, a battery module MDL2-$n$2 connected to a second communication line BS-2 is connected to a first communication line DC-1 forming the communication channel chi. If a confirmation signal is transmitted to the first communication line DC-1 by the module number counter 112 in such a state, the battery module MDL1-$n$1 of the lattermost part connected to the second communication line BS-1 as seen from the wiring diagnostic apparatus 100 increments a variable of the confirmation signal by 1 and transmits the confirmation signal with this rewritten variable to the battery module MDL2-$n$2 of the lattermost part connected to the second communication line BS-2 forming a communication channel ch2. This battery module MDL2- n2 increments the variable of the confirmation signal transmitted by the battery module MDL1-n1 by 1 and transmits the confirmation signal with this rewritten variable to the wiring diagnostic apparatus 100 via an output side line of the first communication line DC-1 as a response signal.

The abnormality determiner 118 determines whether or not a variable value of this response signal is equal to or less than the maximum value n. In the case of the example described above, since the variable value of the response signal is n+1, the abnormality determiner 118 determines that the first communication line DC-1 forming the communication channel ch1 is connected to a battery module MDL of another communication channel as an abnormality in the wiring relationship of the first communication line DC-1 forming a transmission channel. In this case, the information transmitter 120 notifies the control device 310 of information indicating that the first communication line DC-i forming a transmission channel is wired to a battery module MDL of another communication channel.

On the other hand, when the number of battery modules MDL counted by the module number counter 112 is equal to or less than the maximum number n, the abnormality determiner 118 determines whether the reference number of battery modules MDL stored in the storage 130 in advance coincides with the number of battery modules MDL counted by the module number counter 112 (step S126).

Figure 8:
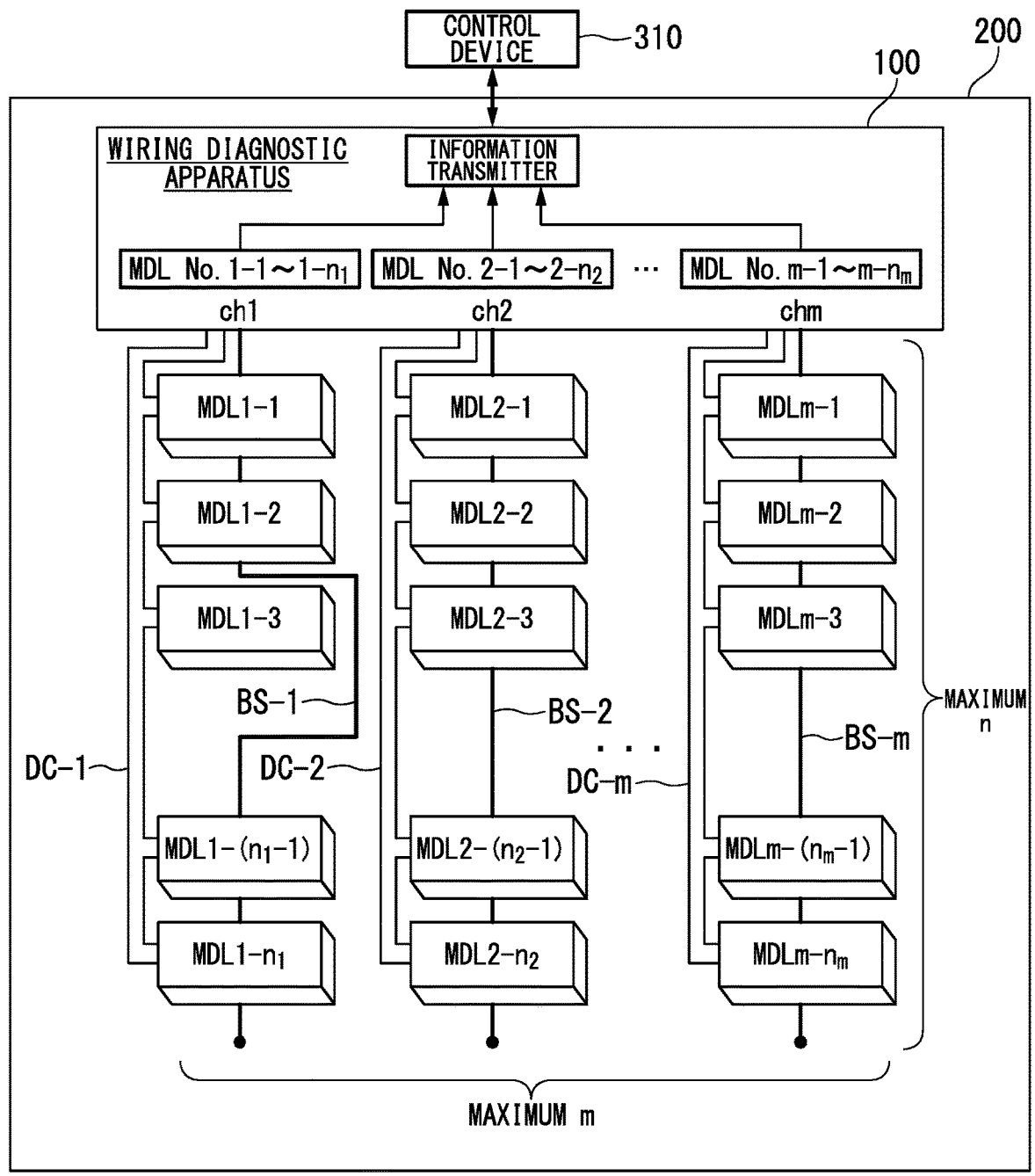
FIG. 8 is a diagram indicating a state in which some battery modules connected to a first communication line forming a transmission channel are not connected to a second communication line forming this transmission channel with the first communication line.

FIG. 8 is a diagram indicating a state in which some battery modules connected to a first communication line DC forming a transmission channel are not connected to a second communication line BS forming this communication channel with the first communication line DC. In the shown example, a battery module MDL1-3 of the communication channel ch1 is connected to the first communication line DC-1, and is not connected to the second communication line BS-1. In such a case, the wiring diagnostic apparatus 100 counts the number of battery modules MDL as n according to a response signal received via the first communication line DC-1, and counts the number of battery modules MDL as n-1 according to the number of pieces of identification information included in an answer signal (state information) acquired via a second communication line BS. Since these numbers of battery modules MDL do not coincide with each other, the abnormality determiner 118 determines that battery modules MDL which need to be connected to a second communication line BS are wired to the second communication line with some missing as an abnormality in the wiring relationship of the second communication line BS. Here, missing indicates a state in which there is a battery module MDL which is not connected to a second communication line BS among battery modules MDL connected to a first communication line DC. In this case, the information transmitter 120 notifies the control device 310 of information indicating that the battery modules are wired with some missing.

Next, the module number counter 112 increments an internal parameter i by 1 (step S130), and determines whether the internal parameter i exceeds the maximum number m of communication channels of the wiring diagnostic apparatus 100 (step S132). The module number counter 112 repeatedly performs processing from step S102 to step S130 described above until a value of a communication channel number reaches the maximum number m of communication channels.

When the value of communication channel number incremented by 1 by the module number counter 112 exceeds the maximum number m of communication channels of the wiring diagnostic apparatus 100, the series information setter 114 sets consecutive numbers for battery modules MDL connected to a plurality of first communication lines DC as information for identifying a battery module MDL for each battery module MDL on the basis of the number of battery modules MDL counted by the module number counter 112 (step S134).

Next, the information transmitter 120 associates information including information such as the presence or absence of a failure or an SOC of each battery module MDL with consecutive numbers set by the series information setter 114, and furthermore associates the associated information with information indicating a type of an abnormality in a wiring relationship, thereby notifying the control device 310 of one piece of management information (step S136). As a result, processing of the present flowchart ends.

FIG. 9 is a diagram which shows an example of management information notified by an information transmitter 120 in the first embodiment. As shown in the example, information on a presence or absence of a failure or an SOC is associated with each piece of identification information of battery modules MDL. In addition, these pieces of associated information and the information indicating a type of an abnormality in a wiring relationship are associated with each communication channel identifier. The control device 310, if such management information is received, causes a display device such as a liquid crystal display which is not shown to display the management information. As a result, a user who views the display device can recognize the presence or absence of an abnormality in the battery system 200 and a type of the abnormality.

The wiring diagnostic apparatus 100 of the first embodiment described above includes the module number counter 112 for counting the number of battery modules MDL connected to a plurality of first communication lines DC to which a plurality of battery modules MDL are connected to form communication channels for each of the first communication lines DC, the module state information acquirer 116 for acquiring state information including identification information for identifying a battery module MDL connected to a corresponding second communication line BS among battery modules MDL connected to a plurality of second communication lines BS forming communication channels with the first communication channels via the second communication line BS, and the abnormality determiner 118 for determining an abnormality in the wiring relationship of a first communication line DC or a second communication line BS on the basis of the number of battery modules MDL counted by the module number counter 112 and state information (identification information) acquired by the module state information acquirer 116. As a result, since an abnormality in the wiring relation is determined for each communication channel even if a battery module MDL is connected to a plurality of communication channels, it is possible to ascertain in which communication channel an abnormality in the wiring relation occurs.

In addition, according to the wiring diagnostic apparatus 100 of the first embodiment, it is possible to determine a type of an abnormality in a wiring relationship by combination of information acquired via a first communication line DC and a second communication line BS even when a wiring mistake occurs due to a human error or the like, or communication lines are short-circuited or signals transmitted to a communication line are leaked due to effects such as aged deterioration of communication lines and external factors.

In addition, according to the wiring diagnostic apparatus 100 of the first embodiment, it is possible to determine whether a battery module MDL has failed depending on the presence or absence of a response signal being received.

In addition, according to the wiring diagnostic apparatus 100 of the first embodiment, when it is determined that an abnormality occurs in a wiring relationship, or when it is determined that a battery module MDL has failed, information indicating this abnormality or failure is transmitted to the control device 310 for controlling a start of the battery system 200, and thus the control device 310 can block a current flowing through battery modules MDL by controlling the circuit breaker 320. Accordingly, the wiring diagnostic apparatus 100 of the first embodiment can prevent the battery system 200 from operating when an abnormality or a failure occurs.

Second Embodiment

Hereinafter, a wiring diagnostic apparatus 100A of a second embodiment will be described. In the wiring diagnostic apparatus 100A of the second embodiment, it is different from in the first embodiment in that a series of pieces of information is not set for each battery module MDL. Accordingly, such difference will be mainly described, and description of common parts will be omitted.

Figure 10:
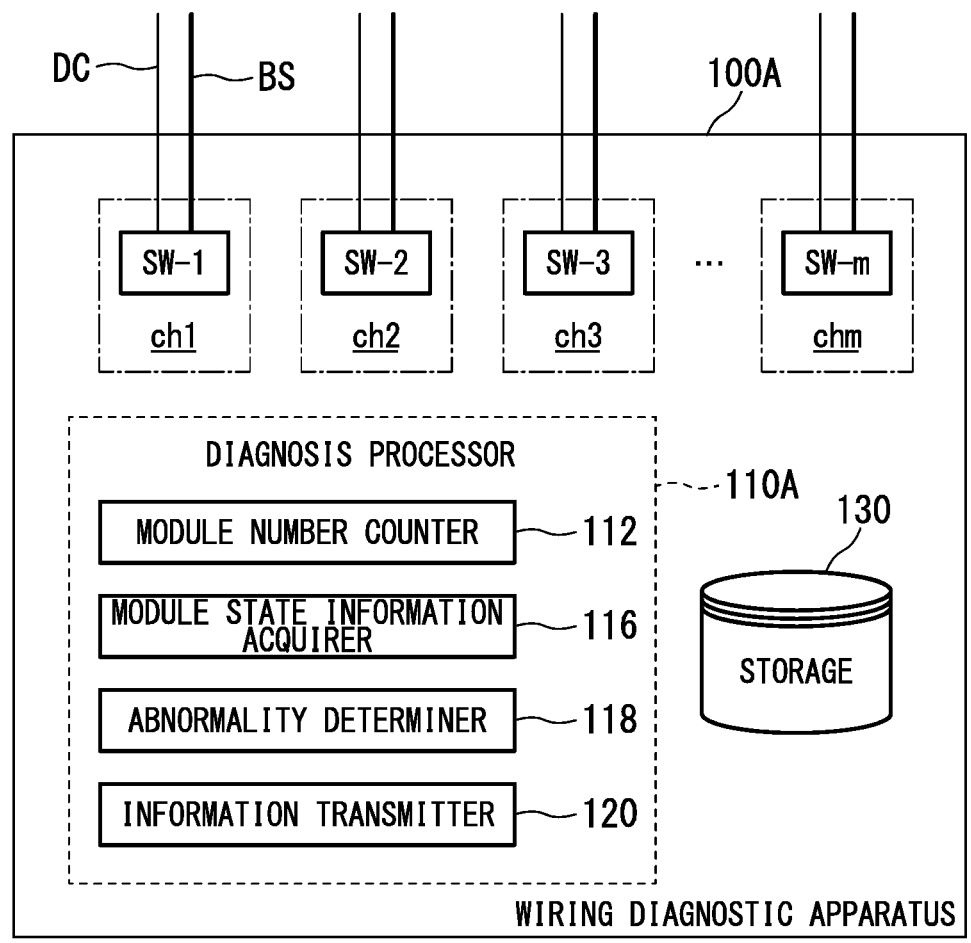
FIG. 10 is a diagram which shows an example of a configuration of a wiring diagnostic apparatus according to a second embodiment.

FIG. 10 is a diagram which shows an example of a configuration of a wiring diagnostic apparatus 100A according to the second embodiment. In a diagnosis processor 110A in the second embodiment, the series information setter 114 of the functional units described above is omitted. In this case, the information transmitter 120 associates information indicating a type of the abnormality in a wiring relationship with each communication channel identifier, and transmits the information to the control device 310 as one piece of management information. Thus, the wiring diagnostic apparatus 100A in the second embodiment can ascertain an abnormality in the wiring relationship of a communication line connected to battery modules MDL in the same manner as in the first embodiment.

According to at least one embodiment described above, the wiring diagnostic apparatus includes the module number counter 112 for counting the number of battery modules MDL connected to a plurality of first communication lines DC to which a plurality of battery modules MDL are connected to form communication channels for each of the first communication lines DC, the module state information acquirer 116 for acquiring state information including identification information for identifying a battery module MDL connected to a corresponding second communication line BS among battery modules MDL connected to a plurality of second communication lines BS forming communication channels with the first communication channels via the second communication line BS, and the abnormality determiner 118 for determining an abnormality in the wiring relationship of a first communication line DC or a second communication line BS on the basis of the number of battery modules MDL counted by the module number counter 112 and state information (identification information) acquired by the module state information acquirer 116. As a result, since an abnormality in the wiring relation is determined for each communication channel even if a battery module MDL is connected to a plurality of communication channels, it is possible to ascertain in which communication channel an abnormality in the wiring relation occurs.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A wiring diagnostic apparatus, comprising:
processing circuitry configured to
count a number of battery modules, of a plurality of battery modules, connected to a first communication line of a communication channel, which is formed by the first communication line and a second communication line physically separate from the first communication line;
acquire identification information identifying those battery modules connected to the second communication line, among the plurality of battery modules;
determine an abnormality in a wiring relationship between the plurality of battery modules and the first communication line or the second communication line based on the counted number of battery modules and the acquired identification information; and
outputting, to a control device for display to an operator, management information indicating the determined abnormality.

2. The wiring diagnostic apparatus according to claim 1, wherein the processing circuitry is further configured to determine a type of the abnormality in accordance with a combination of information acquired via the first communication line and information acquired via the second communication line.

3. The wiring diagnostic apparatus according to claim 1, wherein, when overlapping identification information is acquired via the second communication line and via a different second communication line of a different communication channel, the processing circuitry is further configured to determine that a particular abnormality occurs in which both the second communication line and the different second communication line are connected to one battery module.

4. The wiring diagnostic apparatus according to claim 1, wherein, when an acquired number of pieces of the identification information does not coincide with the counted number of battery modules, the processing circuitry is further configured to determine that a particular abnormality occurs in which there is a certain battery module not connected to the second communication line among the battery modules connected to the first communication line.

5. The wiring diagnostic apparatus according to claim 1, wherein, when the counted number of battery modules exceeds a maximum number of battery modules that can be connected to the second communication line, the processing circuitry is further configured to determine that a particular abnormality occurs in which the first communication line is connected to a certain battery module connected to a different second communication line different from the second communication line forming the communication channel with the first communication line.

6. The wiring diagnostic apparatus according to claim 1, further comprising:

a connection switch provided to correspond to the communication channel and output an ON signal when the first communication line or the second communication line is connected, wherein the processing circuitry is further configured to count the number of battery modules connected to the first communication line corresponding to the connection switch that outputs the ON signal.

7. The wiring diagnostic apparatus according to claim 1, wherein the plurality of battery modules are connected in series by the first communication line, and the processing circuitry is further configured to count the number of battery modules connected to the first communication line by transmitting a predetermined signal to each battery module connected to the first communication line via the first communication line, and analyzing a content of a signal received from each battery module connected to the first communication line via the first communication line in response to the transmitted predetermined signal.

8. The wiring diagnostic apparatus according to claim 7, wherein the processing circuitry is further configured to determine whether an abnormality occurs in the battery modules connected to the first communication line, depending on whether the signal corresponding to the transmitted predetermined signal is received.

9. A battery system, comprising:

the wiring diagnostic apparatus of claim 1; and the plurality of battery modules, which are connected to the wiring diagnostic apparatus in series by the first communication line and transmit increased or decreased information included in a predetermined signal to a next battery module or the wiring diagnostic apparatus when the predetermined signal is received from the wiring diagnostic apparatus via the first communication line.

10. A power system, comprising:

the battery system of claim 9; and a control device configured to communicate with the wiring diagnostic apparatus of the battery system and control a circuit breaker for blocking a current flowing in a particular battery module when an abnormality in a wiring relationship of the first communication line or the second communication line is determined by the wiring diagnostic apparatus.

* * * * *